Aug. 30, 1927.

G. F. SCHERER 1,640,377

METHOD OF MAKING AND FINISHING SPOKES

Filed Oct. 9, 1926

INVENTOR·
George F. Scherer
BY
ATTORNEYS

Patented Aug. 30, 1927.

1,640,377

UNITED STATES PATENT OFFICE.

GEORGE F. SCHERER, OF JACKSON, MICHIGAN.

METHOD OF MAKING AND FINISHING SPOKES.

Application filed October 9, 1926. Serial No. 140,583.

The object of the invention is to provide a simple and effective method of manufacturing spokes which shall make spokes with very accurate miters and tenons with a minimum amount of material and a minimum amount of labor.

Objects relating to details and economies of construction and operation of my invention will definitely appear from the detailed description to follow.

The invention is defined and pointed out in the claims.

A structure which is a preferred embodiment of my invention is illustrated in the accompanying drawing, forming a part of this application, in which.

Figure 1:
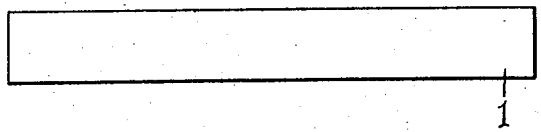
Fig. 1 is an elevation view of a double length spoke billet.
Figure 2:
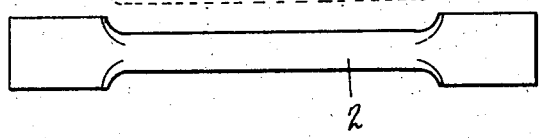
Fig. 2 is a side elevation of the same billet after the first or spoke barrel turning operation, the blade of the turning cutter being indicated by dotted lines.

The parts will be identified by their reference numerals which are the same in all the views.

1 is a double length spoke billet. 2 is a double length spoke billet with the spoke barrel turned in the center of the billet as the first operation of manufacture. The spokes can be sanded and the surface finished at this state. 3 is a specially formed cutter preferably used for the first turning operation. It is preferably a rotary cutter for the simple turning tool would require too much time.

Figure 3:
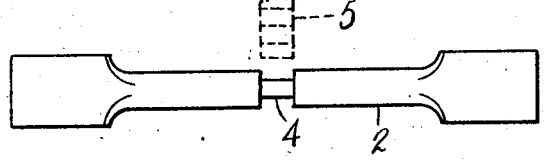
Fig. 3 is an elevation view of the billet with the spoke tenon cut, the tenon cutter being indicated in dotted position.

4 is the tenon kerf (Fig. 3) or annular groove at the center for forming the tenons on the connected spokes. 5 is the rotary tenoning saw for forming the kerf.

Figure 4:
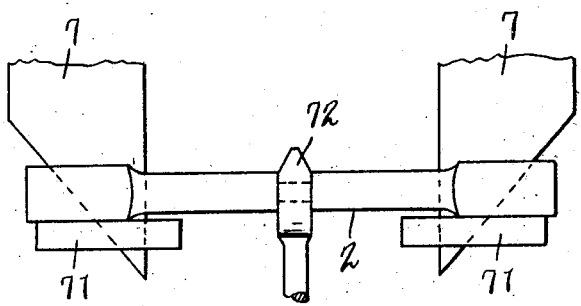
Fig. 4 is a diagrammatic view showing the spokes with the double mitering knives cutting the spoke miter at each end, the spokes being definitely positioned by a central guide.

6, 6 are the mitered ends of the spokes shown in process of formation in Fig. 4. 7, 7 are the opposed mitering knives for cutting the miters at the opposite ends of the double spoke billets at the same time. They react against die plates or bed supports 71, 71. The spoke billet is definitely located in central position by the central guide 72 which engages the kerf so that the two spokes will be formed identically the same.

Figure 5:
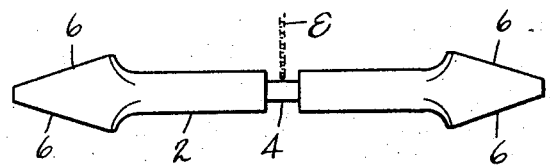
Fig. 5 is a final view showing a cut-off saw severing the double spoke.

In Fig. 5 the last operation is illustrated. The cut-off saw 8 severs the connected spokes by dividing the tenon at the center.

Figure 6:
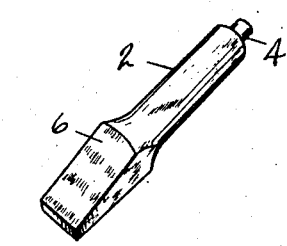
Fig. 6 is a perspective view of a finished spoke.

Fig. 6 is a detail view of the finished spoke.

It is not necessary that the billet be cut exactly to length by this method because the finished wheels are usually bored out at the center and it is best to leave a little surplus stock. However, it will be noted that by this method two spokes are made with substantially the same amount of labor as one, under ordinary methods. Further, there is no waste at the tenon end of the spoke and consequently there is a saving of material to the extent of the clearance there necessary.

However, by providing effective centering means and centering the cutting means, exactly identical spokes are produced and a perfect wheel is the result. This particular method and this particular pains in centering secures this result without any particular tendency to deformation in the formation of the miters because one set of knives exactly counterbalances the other in operation, making it comparatively easy to maintain the spokes in the central position when the miters are formed. Of course, this should be preceded by the effective forming of the tenoning kerf 4.

In practice, the work is done on a spoke lathe, the same being simply adapted to turn this particular shape instead of the regularly shaped spoke, and after the formation of the spokes, cutting the kerf as indicated. Or, this can all be done simultaneously.

Having thus described my invention, what I claim as new and desire to secure by Letters Patent, is:

1. The method of forming spokes consisting in forming a billet of double length, turning the barrel of the spokes at the center, cutting a tenoning kerf at the center, guiding the spokes by the central kerf and cutting the miters simultaneously by opposed symmetrical knives, and then severing the tenon to form the finished spokes, as specified.

2. The method of forming spokes consisting in turning the same from a double length billet, cutting a kerf at the center to form tenons, making use thereof as a guiding means, and then cutting the opposed miters simultaneously, as specified.

3. The method of manufacturing spokes consisting of forming the same from a double billet by turning the barrel at the center, forming a central annular kerf to form the tenons, mitering the ends, and severing the spokes, as specified.

In witness whereof I have hereunto set my hand.

GEORGE F. SCHERER.